United States Patent Office 3,389,743
Patented June 25, 1968

3,389,743
METHOD OF MAKING RESINOUS SHELL MOLDS
Evgeny Ilich Morozov, Leninsky prospect 40, kv. 279;
Alexei Mikhailovich Khromov, Tankovy proezd, poselok
"Leninets," 2/8, kv. 1; Anatoly Ivanovich Ivanov, 13
Parkovaya ulitsa 38, Korpus 1, kv. 52; and Alexander
Sergeevich Goloschekov, 1 Juzhno-Portovy proezd
18/60, kv. 50, all of Moscow, U.S.S.R.
No Drawing. Filed July 12, 1965, Ser. No. 471,457
3 Claims. (Cl. 164—43)

ABSTRACT OF THE DISCLOSURE

A method of making molds, for example, foundry molds, by depositing a graphite-containing suspension on the pattern to be cast. The suspension comprises a solution of a resol resin, for instance, phenolbaryta resin, which upon calcining decomposes producing elementary carbon. Apart from a solution of the resol resin, the suspension may contain powdered titanium as a carbide-forming element enhancing the strength and refractoriness of the mold.

The present invention relates to casting metals and alloys, and more particularly to a method of making a mold, for example, for foundary practice.

It is known in the art that the most advantageous method of making complicated, thin-walled castings, considerably increasing the yield of metal, is a method of precision casting in molds made by the so-called "lost-wax" process. The application of this method is especially expedient in making castings of titanium and other refractory, highly reactive metals and alloys difficult for machining. By more accurately casting the volume of work required for the machining of the castings is decreased.

Known in the art is a lost-wax method of making molds by dipping the form into a slurry prepared on the basis of highly refractory oxides (aluminum oxide, molten zirconium dioxide, etc.) with the subsequent firing of a green mold. When making these molds, a hydrolyzed solution of ethyl silicate or water glass is used as a bonding medium.

When pouring a highly reactive, refractory metal in vacuo into such molds, silicon dioxide of the bonding medium is reduced by the metal being cast, which results in the formation in castings of subcutaneous blowholes, blisters and of sand crust. Attempts have been made to employ in the slurries used for the making of molds by the lost-wax process graphite along with the quartz powder. These molds, however, were found to be inadequate for casting titanium, due to the reduction of oxides contained in the mold with carbon and the metal cast when casting the metal in vacuo, which resulted in the evolution of a large volume of gaseous reaction products engendering blowholes in the castings thus obtained.

An object of the present invention is to provide such a method of making molds, for example, for the foundry practice, by the low-wax process that would provide for the manufacture of castings of highly reactive, refractory metals that would have no blowholes, blisters, or sand crust.

According to these and other objects, in the proposed method of making a mold, for example, for the foundary practice, by covering a wax pattern with a slurry containing graphite with subsequent firing of the green mold, a solution of resol resin, for example, phenol-baryta resin coking when fired, is added to the slurry.

Along with the solution of resol resin, the powder of titanium may be added to the slurry, titanium being a carbide forming element increasing the strength and heat resistance of the mold produced therefrom.

The herein proposed method of making graphite molds by the lost-wax process involves the following operations: Firstly, a preparation of a slurry containing the powder of graphite (or powder of graphite and titanium) and an alcoholic solution of resol (for example, phenol-baryta) resin is made; the refractory coating is applied in layers on a wax pattern by dipping said pattern into the graphite-resin slurry with the subsequent immersion of it into a catalyzer (so-called Petrov's contact), and the coating of the shell produced by a layer of graphite powder. The de-waxing by heating the mold to permit the wax to run out is performed and the green mold is fired.

To prepare the graphite-resin slurry, the resol resin, for example, phenol-baryta resin, is first diluted with alcohol until the density of 0.86 to 0.92 g./cm.$^3$ is obtained. Then, into the solution of resin the powder of graphite having a granularity of 0.03 to 0.08 mm. is added with stirring, in a ratio of 500 to 600 g. per liter of the solution until the density of the slurry is equal to 1.18 to 1.22 g./cm.$^3$.

Generally, this means that the slurry contains about 42–47 wt. percent graphite and about 53 to 58 wt. percent of a solution of resol resin.

In the case of using in the slurry not only the graphite but also the powder of titanium, a mixture of powders of titanium and graphite is added into the solution of resin in a ratio of from $9/100$ to $10/100$.

Generally; this means that the slurry will contain about 40–42 wt. percent graphite, about 0.5–5 wt. percent titanium powder and about 53–58 wt. percent of a solution of resol resin.

A degreased assembly of wax patterns is first dipped into an alcoholic graphite solution having the density of 0.88 to 0.92 g./cm.$^3$. After being withdrawn from this solution, the assembly of patterns is dried at a temperature of 25 to 28° C. during 3 hours, being then dipped into a premixed graphite-resin slurry, the assembly being rotated therein with the view of eliminating air bubbles from the internal cavities of the pattern and of attaining a uniform distribution of the slurry over all of the surface of the pattern. The assembly of patterns thus coated is held in the air for 2 to 5 min., upon which it is dipped into the Petrov's contact, being a catalyzer accelerating the solidification of the slurry applied to the surface of the assembly of patterns. After the excess of the catalyzer has run off, a layer of graphite powder having the granularity of 0.1 to 0.3 mm. is applied to the slowly rotating assembly of patterns. Upon finishing this last operation the assembly of patterns is dried at a temperature of 25 to 28° C. for a period of 6 hours.

After the first layer has been dried, the remaining layers are applied in the same sequence of operations as that performed during the application of the first layer. Usually, about 6 to 8 layers of the coating are applied onto the assembly.

A sufficient number of layers being thus applied, the wax is run out from the mold by any of the known methods, such as by means of hot water, steam or heated air. Then, the graphite-resin molds with closed gates and runners are placed into a metallic container and covered with graphite powder.

The closed container with the molds is then placed into a furnace having a temperature of 100 to 400° C. which is thereafter increased up to 800 to 900° C.; the molds are held at this temperature for a period of 2 hours, after which the furnace is switched off and cooled together with the molds to a temperature of 500° C. Then the container is discharged from the furnace and cooled in the air to a temperature of 200 to 250° C. with the molds being afterwards removed therefrom.

The preheated molds are then placed into a high-temperature furnace where they are held in a vacuum or in a protective-gas atmosphere at a temperature of 2200 to 2500° C. for a period of 1.5 to 4 hours, the longer time of holding being required for firing complicated molds with a large number of internal walls. Upon the elapsing of the time prescribed, the furnace with the molds is disconnected from the supply source and is allowed to cool down to a temperature of 100 to 200° C. The finished molds are then withdrawn from the furnace and transferred for casting, or placed in storage in a drying cabinet having a temperature of 100 to 200° C.

During the operations of withdrawal of molds and of firing them, the graphite-resin mold undergoes a stable shrinkage equal to 3%.

The shell investment of the mold being filled with molten metal easily separates from the casting, and may be reutilized for making new molds upon having been crushed and separated into fractions.

The castings of highly reactive, refractory metals, for example titanium, obtained in molds made according to the proposed lost-wax method, are characterized by a high finish of their surface, being completely free from such defects as sand crust and blowholes; the molding mixture in this procedure is easily removed even from the internal civities of castings.

The graphite-resin mold of the invention, made of the readily available raw materials, prevents the interaction of the mold material with the metal being poured in it, thus contributing to a wide application of a technique of making castings of any shape of highly reactive metals with a minimum amount of labor required.

What is claimed is:

1. A method of making molds for foundry practice, comprising the steps of preparing a slurry consisting essentially of graphite and a solution of resol resin, wherein the resin is phenol-baryta, and the slurry contains about 42 to 47 wt. percent of graphite and about 53 to 58 wt. percent of said solution of resin coating a wax pattern with said slurry, removing the wax from the so prepared mold and firing same.

2. A method of making molds for foundry practice comprising the steps of preparing a slurry consisting essentially of graphite, titanium powder, and a solution of resol resin, coating a wax pattern with said slurry, removing the wax from the so prepared mold and firing same.

3. A method as claimed in claim 2 wherein the resin is phenol-baryta, and the slurry contains about 40 to 42 wt. percent of graphite, about 0.5 to 5 wt. percent of titanium powder and about 53 to 58 wt. percent of said solution of resin.

References Cited

UNITED STATES PATENTS

| | | | |
|---|---|---|---|
| 2,886,869 | 5/1959 | Webb et al. | 164—8 |
| 2,965,514 | 12/1960 | Less et al. | 106—38.2 |
| 3,070,991 | 1/1963 | Holbrook et al. | 106—38.2 X |
| 3,177,084 | 4/1965 | Amstein | 106—38.28 X |
| 3,257,692 | 6/1966 | Operhall | 164—26 |

J. SPENCER OVERHOLSER, *Primary Examiner.*

E. MAR, *Assistant Examiner.*